Figure 1:
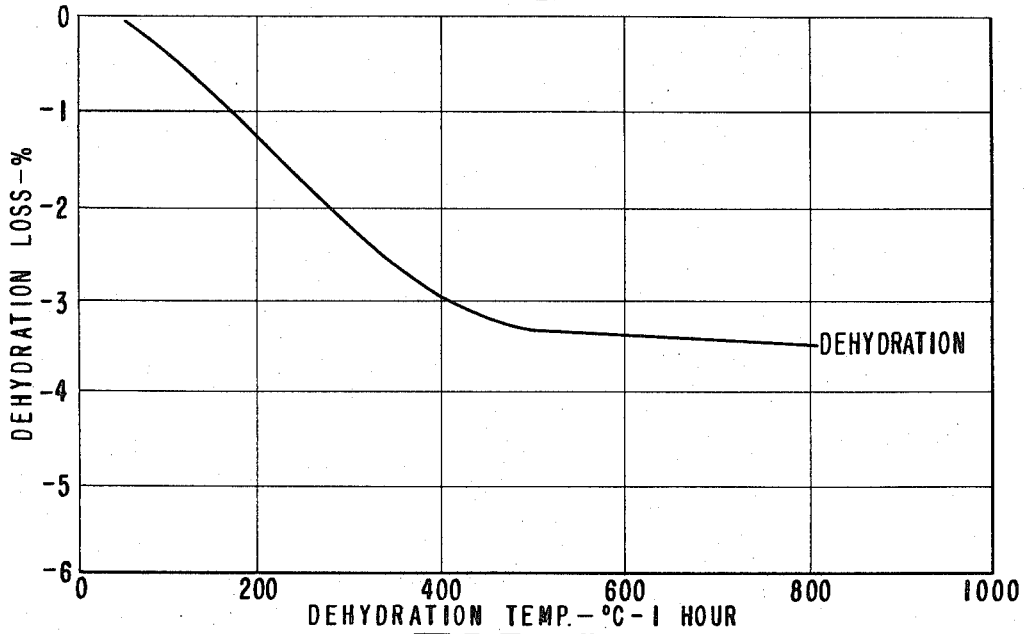
Figure 2:
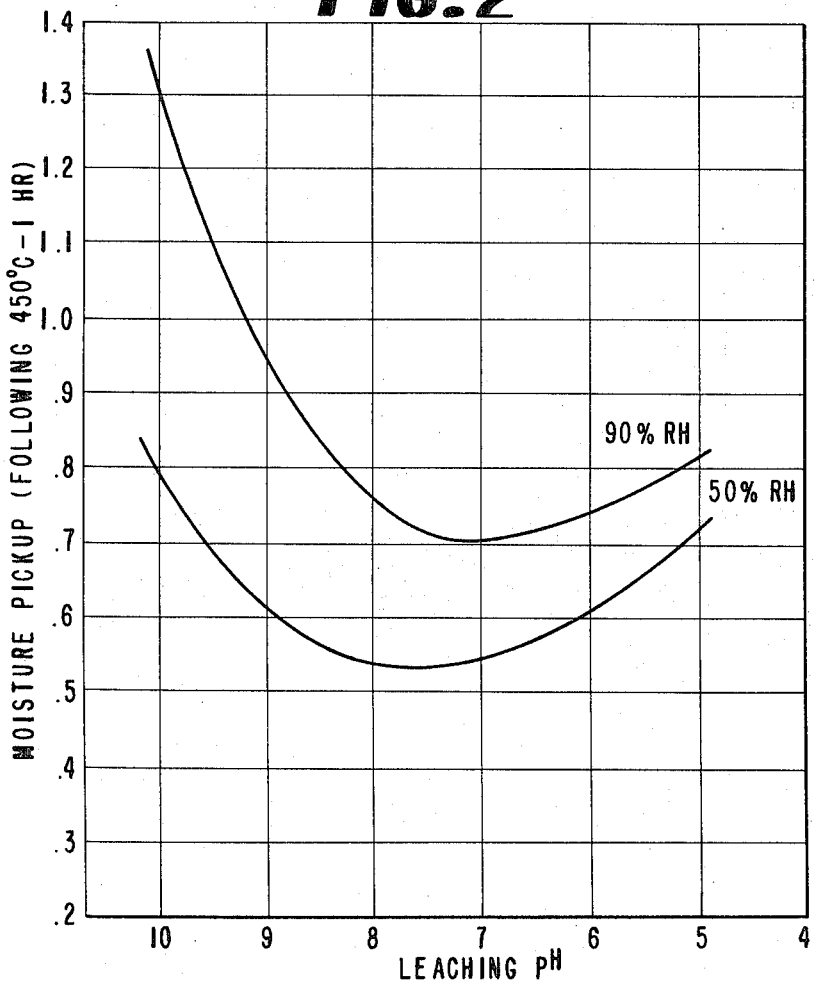

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 8

T904,014

LEACHING/HEATING PROCESS FOR POTASSIUM TETRATITANATE FIBERS

David P. Fields, Wilmington, Del., assignor to E. I. du Pont de Nemours and Company, Wilmington, Del.

Filed Mar. 15, 1972, Ser. No. 234,879

Int. Cl. C01g *23/00*

U.S. Cl. 423—598

1 Sheet Drawing. 2 Pages Specification

Fibrous potassium titanate is acid leached to a $$K_2O/TiO_2$$

molar ratio of 1/8 and the resultant product, the predominate crystal structure of which is potassium octatitanate, is then heated to a temperature of 400° C. to 700° C. to remove water. Fibers so obtained are especially useful as a reinforcement material for plastics. Acid leaching reduces the susceptibility of the fibers to moisture pick-up.

Nov. 7, 1972 D. P. FIELDS T904,014

LEACHING/HEATING PROCESS FOR POTASSIUM TETRATITANATE FIBERS

Filed March 15, 1972